United States Patent [19]
Schneider

[11] Patent Number: 6,140,632
[45] Date of Patent: Oct. 31, 2000

[54] METHOD FOR PRODUCING A SPATIALLY STRATIFIED OPTICAL SYSTEM FOR USE IN THE MICRON AND SUB-MICRON WAVELENGTH REGIME

[75] Inventor: Stanley Schneider, Rancho Palso Verdes, Calif.

[73] Assignee: McDonnell Douglas Corporation, Seal Beach, Calif.

[21] Appl. No.: 09/165,786

[22] Filed: Oct. 2, 1998

[51] Int. Cl.[7] .................................................. H01J 3/14
[52] U.S. Cl. .................................... 250/216; 359/652
[58] Field of Search .................................. 250/216, 226, 250/203.1, 203.6, 201.2; 359/652, 653, 654, 642, 252

[56] References Cited

U.S. PATENT DOCUMENTS

| | | | |
|---|---|---|---|
| 2,761,141 | 8/1956 | Strandberg et al. | 343/911 |
| 2,849,713 | 8/1958 | Robinson, Jr. | 343/910 |
| 3,307,187 | 2/1967 | Horst | 343/18 |
| 3,666,347 | 5/1972 | Kitano et al. | 350/96 B |
| 3,914,769 | 10/1975 | Andrews | 343/911 L |
| 4,025,157 | 5/1977 | Martin | 350/96 |
| 4,288,337 | 9/1981 | Ota et al. | 252/512 |
| 4,470,698 | 9/1984 | Green, Jr. et al. | 356/152 |
| 4,531,129 | 7/1985 | Bonebright et al. | 343/754 |
| 4,830,454 | 5/1989 | Karstensen | 350/96.18 |
| 5,047,776 | 9/1991 | Baller | 342/52 |
| 5,225,668 | 7/1993 | Hilliard et al. | 250/206.2 |
| 5,384,458 | 1/1995 | Hilliard et al. | 250/227.17 |
| 5,421,848 | 6/1995 | Maier et al. | 65/102 |
| 5,638,214 | 6/1997 | Doric | 359/654 |

OTHER PUBLICATIONS

Wolfgang K.H. Panofsky, *Classical Electricity and Magnetism*, 1955, pp. 33–35, Addison–Wesley Publishing Company, Inc., Reading, Massachusetts (Month Unknown).

Marvin L. Goldberger & Kenneth M. Watson, *Collision Theory*, 1955, pp. 772–775, John Wiley & Sons, Inc., New York/London/Sydney (Month Unknown).

*Primary Examiner*—Que T. Le
*Attorney, Agent, or Firm*—Lawrence N. Ginsberg

[57] ABSTRACT

A method for producing a spatially stratified Optical System includes the steps of a) selecting a suitable, spatially stratified profile of index of refraction to achieve an optical system having a desired performance; b) selecting an atomic/molecular species having a suitable index of refraction in a desired operational wavelength band; c) forming sub-micron pellets of the species; and d) placing the pellets into a host material while controlling the density of the placement. The density is varied to achieve a local index of refraction value for the optical system in accordance with the selected stratified profile. The wavelength regime the optical system is designed for is much greater than the characteristic scale of stratification, which in turn is much greater than the spatial size of the pellets. The optical system is much greater than the wavelengths in the wavelength regime.

5 Claims, 1 Drawing Sheet

METHOD FOR PRODUCING A SPATIALLY STRATIFIED OPTICAL SYSTEM FOR USE IN THE MICRON AND SUB-MICRON WAVELENGTH REGIME

BACKGROUND OF THE INVENTION

1. Field of the Invention

The present invention relates to lens fabrication of continuous stratified indices of refraction at short wavelengths and more particularly to lens fabrication in the IR, visible and ultraviolet wavelength regimes.

2. Description of the Related Art

Among the enabling technologies that are desired by the contemporary aerospace art are sensors that are capable of detecting, and/or discriminating types of targets, and even identifying actual targets beyond the radar regime. This would enable one to diminish the effectiveness of stealth design. Further, it is desired to have the capability of a wide field of view to allow for a lighter, lower volume system than now exists. It is also desired that a sensor be geometrically adaptable to the carrier vehicle's geometry so as to minimize the sensor's contributions to aero-drag and radar backscatter. The sensor should be capable of operation somewhere in the IR through the near UV spectral regimes, so a stealth design of the target is not readily feasible. The technology must possess a very wide field of view and an appropriate angular resolution accuracy to be able to detect targets at tactically interesting ranges and be capable of operation somewhere in the IR through the near UV spectral regimes.

Stratified lenses are found in living species, from insects to human beings, to provide wide-angle vision. Such vision, for example, provides increased awareness of predators.

During World War II, R. K. Luneberg performed fundamental geometric optics investigations on stratified lenses. The desire was to maximize the field of view by continuously changing the index of refraction with position. In particular, he proposed a spherical lens with a particular stratified distribution that produced a maximum field of view of $2\pi$ steradians.

U.S. Pat. No. 4,288,337, issued to H. Ota et al., describes a method to lower the weight of an artificial dielectric by using fewer loadings of high dielectric constant. However, Ota's loadings are not sub-micron, as are necessary for use in very short wavelength regimes. Ota's loadings are of millimeter size applicable solely to the radar field of many centimeter wavelength. His loadings are metallic coated which at short wavelengths would block the waves from being influenced by their dielectric values and result in a very lossy system.

U.S. Pat. No. 5,421,848, issued to G. Maier et al., similarly describes a lens for the microwave domain. As in the Ota et al. patent, Maier et al. did not teach how to extend the technology to the IR, visible, and UV regimes.

U.S. Pat. No. 2,849,713, issued to G. P. Robinson, Jr., also describes a microwave system without teaching how to extend the Luneberg art to the shorter wavelength regimes.

U.S. Pat. No. 3,666,347, issued to 1. Kitano et al., describes a lens of millimeter size loadings appropriate to microwave wavelengths, without teaching how to extend this technique.

U.S. Pat. No. 3,914,769, issued to W. J. Andrews, describes another method suitable only in the microwave regime.

Other patents that pursue the Luneberg lens concept include the following: U.S. Pat. No. 5,047,776; U.S. Pat. No. 5,638,214; U.S. Pat. No. 4,025,157; U.S. Pat. No. 4,830,454; U.S. Pat. No. 5,225,668; U.S. Pat. No. 5,384,458; U.S. Pat. No. 3,307,187; U.S. Pat. No. 2,761,141 and U.S. Pat. No. 4,531,129.

None of these aforementioned patents describe the application method disclosed in the present patent application.

OBJECTS AND SUMMARY OF THE INVENTION

It is therefore a principal object of the present invention to provide a method for producing a large field of view optical system for use in the micron and sub-micron wavelength regimes.

It is another object to produce a spatially stratified optical system for enhanced performance.

It is yet another object to fabricate a Luneberg spherical stratification pattern to achieve maximum field of view.

These and other objects are achieved by the present invention which comprises, in its broad aspects, the steps of: a) selecting a suitable, spatially stratified profile of index of refraction to achieve an optical system having a desired performance; b) selecting an atomic/molecular species having a suitable index of refraction in a desired operational wavelength band; c) forming sub-micron pellets of the species; and d) placing the pellets into a host material while controlling the density of the placement. The density is varied to achieve a local index of refraction value for the optical system in accordance with the selected stratified profile. The wavelength regime the optical system is designed for is much greater than the characteristic scale of stratification, which in turn is much greater than the spatial size of the pellets. The optical system is much greater than the wavelengths in the wavelength regime.

Such wide-angle lenses may be used for deployment on aircraft, ships and tanks as the basis for enhanced detection, identification of targets and as part of a fire-control system. The system can be well applied to the detection of intruders in both civilian and military surveillance.

These and other objects, advantages and novel features of the present invention will become apparent from the following detailed description of the invention when considered in conjunction with the accompanying drawings.

DETAILED DESCRIPTION OF THE PREFERRED EMBODIMENT

As noted above, Rudolph Luneberg, in his geometric optics investigations laid the theoretical groundwork for achieving a large field of view lens. However, what was missing in Luneberg's and subsequent investigators' work was a method to construct such a stratified lens so that it could be used in the short wavelength regimes of IR, visible, and UV wavelengths.

Figure 1:
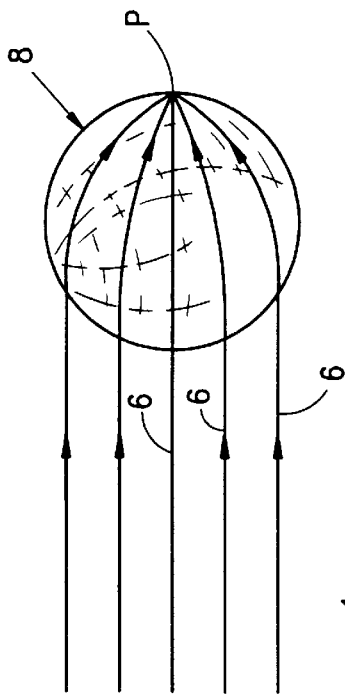
FIG. 1 (Prior Art) is a perspective schematic view of a Luneberg stratified lens which focuses all rays from a given direction to a unique point.

A Luneberg lens has the attractive property that all the electromagnetic rays incident with a common direction on the finite spherical lens converges to a point on the surface of the lower hemisphere. This phenomenon is illustrated in FIG. 1 (Prior Art) which shows incident rays 6 being focused by a Luneberg stratified lens 8 to a point P on the back (lower) hemisphere surface. The field of view is very large. The intensity varies as Cos (a) Cos (b), where a, b are the angles from the normal. So, at a=b=45 degrees there is only a 50% reduction in signal (6 dB). Since nature does not provide for continuous spatially varying index of refraction n (r) or dielectric constants ($\kappa=n^2$) one must settle for approximating the exact Luneberg stratified profile n (r)= SQRT[$2-(r/r_o)^2$]. Here $r_o$ is the radius of the sphere and r is the radial position. One technique previously pursued (e.g., U.S. Pat. No. 4,288,337, issued to Ota et al.) involves building the lens by a few layers of slightly different dielectric values. The layers must be thin compared to the wavelength. This is readily achieved in the microwave regime where the wavelength is on the order of a few centimeters or more. To achieve this in the much shorter wavelength domain of IR, visible, and UV is beyond the state of the existing art. The basis of the present patent application is to achieve this at much shorter wavelengths.

In order to be able to construct such a stratified lens for the much shorter wavelengths, the present method utilizes radially stratified loadings of sub-micron sized scatterers in a host medium (e.g., plastic or low density aerogel), whose dielectric constant is close to the empty air outside the lens, to produce an artificial dielectric lens.

The wavelength the lens is designed for is to be much bigger (factor of ten) than the characteristic scale of stratification (S) which in turn is a factor of ten bigger than the spatial size of the dielectric scatterers (s) that we are loading with a continuous spatially varying density (number of scatters/vol. of host material). The dielectric properties within the sub-micron scatterers arise from the electric polarization of the atoms/molecules in it, which are another 1/10 size smaller than that of the scatterers' spatial size. The atomic/molecular species selected must be of low loss in the wavelength band to be used and its dielectric value must be acceptably slowly varying over the wavelength band it can be used in.

The passive sensor application would typically use a band of frequencies to receive an acceptable signal level at tactically desired ranges. The application to sensing the active return from a laser excitation is less demanding since the situation is monochromatic and of typically larger signal strength. Similarly, it is monochromatic for its application as a wide-angle laser beam steerer. Here by reciprocity, the laser signal would enter from a fiber at a spot on the sphere's surface and the lens would eject the rays at a direction corresponding to the spot position.

Theoretical analysis of the artificial dielectric mechanism was performed so the parametrics required to construct the desired Luneberg spatial profile are in hand. The physics involves the so-called Optical Theorem which relates the total scattering crossection to the imaginary part of the forward scattering wave amplitude. This is, in turn, related in the long wavelength limit to the electrical polarization which produces the permittivity and hence the dielectric value.

In the appropriate long wavelength limit we obtain a Lorentz—Lorenz (Clausuis-Mossati) type expression (see e.g., Panofsky, W., & Phillips, M., Classical Electricity & Magnetism, Addison-Wesley Co., Reading, Mass., pg. 34 (1955), or Goldberger, M. L. & Watson, K. M., Collision Theory, John Wiley & Sons, Inc., N.Y., pg. 775 (1955)) for the effective dielectric of the local spatial location in terms of the small scatterers' species dielectric value and the loading density of these scatters in the host material. Now, by tailoring the loading pattern one fabricates the spatially stratified lens. For an effective index of refraction for the artificial medium formed by the loading of the small scatterers, $n_d$, the fill factor, F, or the fraction of the 3 dimensional space locally loaded is $$F=\text{Fill Factor}=NsVs=[1/\chi_s]*(n_d^2-1)/(n_d^2+2),$$

where Ns the scatterers density, Vs is the volume of the scatterers and $\chi_s$ is the electrical susceptibility of the scatterer species equal to $k_s-1=n_s^2-1$. Here $k_s$, $n_s$, are the dielectric constant and the index of refraction of the scatterer species, respectively.

For a special case of interest, the Luneberg lens for which the device's spatially straified index of refraction, $n_d(r)$, is given by $$n_d(r)=SQRT[2-(r/r_o)^2];$$

one has $$F=\text{Fill Factor}=N_sV_s=[1/\chi_s]*\{1-(r/r_o)^2\}/[4-(r/r_o)^2].$$

The fill factor varies from zero at the sphere's surface to $[4\chi_s]^{-1}$ at the center. Since F can be, at most one, one must use a species with a $\chi_s$ value of at least 1/4 or a $n_s$ value of at least $(1.25)^{1/2}=1.12$. The larger the scatterer species $\chi_s$ value is the smaller are the fill factors required and the easier it is to fabricate the stratified artificial dielectric lens.

Initial focus was on the IR and visible regime because of the emissivities of aircraft and missile in the target application identified. Various species were identified as appropriate for various wavelength bands including the near UV. [Such data may be found in such references as Palik, E.D. (Ed.) Handbook of Optical Constants, Academic Press, San Diego, Calif. (1985); and Palik, E.D. (Ed) Handbook of Optical Constants II, Academic Press, San Diego, Calif. (1991).]

The best candidates for use are the semiconductor for photon energies below their bandgap values where the absorption is very low, $<(10)^{-4}$, and where they have index of refraction values significantly bigger than 1.12 (for ease of stratifying the Luneberg profile). See Table 1 for a sample (representative but not exhaustive) list.

TABLE I

Suitable Candidate Scatterers - Low Absorption & $n_s$ values >1.12

| Species | Wavelength Regime (μm.) | Species index of refraction $n_s$ | Species electrical susceptibility $\chi_s$ |
| --- | --- | --- | --- |
| Cadmium Telluride | 0.86–10.6 | 2.95–2.65 | 7.70–6.02 |
| Gallium Arsenide | 0.91–12.65 | 3.57–3.26 | 11.7–9.63 |
| Gallium Phosphide | 0.54–2.15 | 3.46–3.04 | 11.0–8.24 |
| Germanium | 1.823–14.71 | 4.17–4.00 | 16.4–15.0 |
| Indium Arsemide | 4.0–20.7 | 3.50–3.30 | 11.13–9.89 |
| Indium Phosphide | 0.96–10.33 | 3.36–3.04 | 10.29–8.24 |
| Silicon | 1.148–10.2 | 3.53–3.42 | 11.46–10.70 |
| Silicon Carbide | 0.405–5.2 | 2.765–2.467 | 6.645–5.09 |
| Zinc Sulfide | 0.22–14.6 | 2.32–2.18 | 4.38–3.75 |

Fabricating the small scatterers of this semiconducting material is state of the art. The radially position changing Fill Factor, F, given above is achieved by changing the placement density of the sub-micron size scatterers inserted in the mold as one is rotates the lens being fabricated. The largest scatterer density is at the starting core, which becomes the center. The outer radius of the spherical object has no scatterer filling, just the host material. The spherical lens is then immersed in a mode of the host material to be shaped to conform to the vehicle surface geometry at the sensor's insertion location. The system would place the photon counting pixel array on the surface of the back hemisphere, so each pixel is counting all the photons from a particular solid angle. For greater angular resolution a larger lens is used. For example, using pixels that are 1 micron square in a 1 cm. diameter lens resolves the signal direction to 10 nano-steradians, while a meter sized lens resolves to a pico-steradian.

Figure 2:
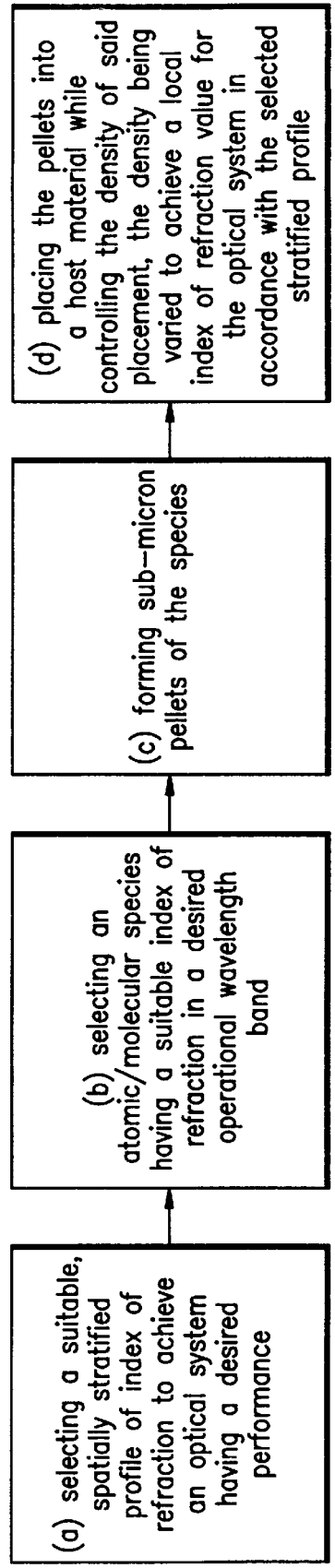
FIG. 2 is a flow diagram of the method for producing a spatially stratified optical system of the present invention.

Having laid out the physical mechanism and having displayed sample data to allow the production of a spatially stratified lens, a general method for producing the applicable system for use in the micron and sub-micron wavelength regimes is illustrated in FIG. 2, designated generally as 10. There are four major steps:

a) The optical system, including its performance characteristics, which are desired to be produced, is identified. The performance characteristics include the system's size, weight, operational wavelength regime, field of view, and location of the optical signal measurement. Using known analytic solutions of optical ray transmission patterns through stratified media, or by using available geometric optical codes, an index of refraction spatial profile which produces the desired characteristics or a satisfactory approximation to these characteristics is determined.

A preferred embodiment of this is the Luneberg lens profile, i.e., $n_d(r)=SQRT[2-(r/r_o)^2]$, to produce a lens of $2\pi$ steradian field of view transporting all rays of the given incident angle to a point on the back hemisphere.

b) Knowing the wavelength band that one wishes the lens to operate at, an atomic or molecular species is selected to build the pellets (scatterers) to load the host medium material to build a spatially stratified lens. The atomic/molecular species must be acceptably lossless in the desired wavelength band and have an acceptably mildly bearing dielectric constant (or equivalent index of refraction) in the band of interest. The host medium material should be selected to have an index of refraction acceptably close to that of the surrounding environment in which the optical system will be used, i.e., outside the lens region. The material density must be low enough, given the size of the lens, that its total weight meets the specifications decided in Step a). The host medium material must be acceptably lossless in the operation regime.

Table 1, shown above, lists some preferred species and their wavelengths of operation. The species include semiconductors for wavelength regimes where photon energies are below their bandgap effect values so as to produce very low absorption and mildly varying indices of refraction. A suitable host material for low weight lenses is a low density aerogel of density $10^{-3}$ gm/c.c. However, the use of aerogels as a host medium material introduces some undesired optical losses and dispersion. If weight is not a critical characteristic it is preferred to use a homogenous host material such as a transparent plastic.

c) Having identified the materials to be used to produce the stratified lens, sub-micron sized pellets of the loading (scatterers) pellets are formed. The manner in which the pellets are formed is well known within the art. Presently, objects of mesoscopic ($10^{-8}$ to $10^{-7}$ meters) size and nanoscopic ($10^{-9}$ meters) size are routinely fabricated in the meso and nano machinery fields.

d) The pellets are then placed into the selected host material while controlling the density of the placement. The density is varied to achieve the local index of refraction, nd, determined in Step a) for the given optical system. The Fill Factor describing the controlled density of pellet placement is given by the equation:

$$F=\text{Fill Factor}=N_sV_s=[1/\chi_s]*(n_d^2-1)/(n_d^2+2).$$

To produce an acceptable approximation of the spatial stratified index of refraction optical system, the characteristics scale of placing the pellets (scale of stratification) must be much smaller than the wavelength values of the optical system's operation. The size of the optical system, in turn, must be much larger than the wavelength. The stratification scale must be much greater than the spatial size of the pellets. The terms "much greater" as used herein refers to a factor of 10 or greater.

Examples of optical system parameters in the IR/Visible/UV regimes are a lens of a centimeter or greater in size, wavelengths of $10^{-3}$ to $10^{-5}$ centimeter, a stratification scale of $10^{-4}$ to $10^{-6}$ centimeters, and pellet sizes to the size of $10^{-5}$ to $10^{-7}$ centimeters. The scale of atomic/molecular separations is $10^{-8}$ centimeter, much smaller than the pellet size, as it must be.

The Fill Factor described in the controlled density of pellet placement is given by the equation noted above:

$$F=\text{Fill Factor}=N_sV_s=[1/\chi_s]*[1-(r/r_o)^2]/[4-(r/r_o)^2].$$

This Fill Factor produces the preferred stratified index refraction lens (Luneberg) given by:

$$n_d(r)=SQRT[2-(r/r_o)^2],\text{ provided above.}$$

Obviously, many modifications and variations of the present invention are possible in light of the above teaching. It is, therefore, to be understood that, within the scope of the appended claims, the invention may be practiced otherwise than as specifically described. What is claimed and desired to be secured by Letters Patent of the United States is:

1. A method for producing a spatially stratified optical system for use in the micron and submicron wavelength regime, comprising the steps of:

a) selecting a suitable, spatially stratified profile of index of refraction to achieve an optical system having a desired performance;

b) selecting an atomic/molecular species having a suitable index of refraction in a desired operational wavelength band;

c) forming submicron pellets of said species; and d) placing said pellets into a host material while controlling the density of said placement, said density being varied to achieve a local index of refraction value for the optical system in accordance with said selected stratified profile, wherein the wavelength regime that the optical system is designed for is much greater than the characteristic scale of stratification, which in turn is much greater than the spatial size of said pellets, said optical system being much greater than the wavelengths in the wavelength regime.

2. The method of claim 1, wherein said step of placing said pellets into a host material while controlling the density of said placement, comprises the step of varying the placement density, $N_s$, in accordance with the relationship:

$$F=\text{Fill Factor}=N_sV_s=[1/\chi_s]*(n_d^2-1)/(n_d^2+2)$$

where F is the fraction of the 3 dimensional space locally loaded by said pellets of said species to produce an optical system effective index of refraction $n_d(r)$ at a vector position r, where Ns is the density of the placement of the pellets; $V_s$ is the volume of each pellet; and $\chi_s$ is the electrical susceptibility of the pellet species=$\kappa_s-1=n_s^2-1$, where $\kappa_s$ is the dielectric constant of the species, and $n_s$ is the index of refraction of the species.

3. The method of claim 1, wherein said optical system is spherical, said step of placing said pellets into a host material while controlling the density of said placement, comprises the step of varying the placement density, $N_s$, in accordance with the relationship:

$$F = \text{Fill Factor} = N_s V_s = [1/\chi_s]*[1-(r/r_o)^2]/[4-(r/r_o)^2]$$

where F is the fraction of the 3 dimensional space locally loaded by said pellets of said species to produce an optical system index of refraction $n_d(r)$ at a radial position r of $n_d(r) = \text{SQRT}[2-(r/r_o)^2]$, $r_o$ being the radius of the sphere, where $N_s$ is the density of the placement of the pellets; $V_s$ is the volume of each pellet; and $\chi_s$ is the electrical susceptibility of the pellet species = $\kappa_s - 1 = n_s^2 - 1$.

4. The method of claim 1, wherein said step of placing said pellets into a host material comprises the step of placing said pellets into a host material having an index of refraction close to that of the surrounding environment in which the optical system will be used.

5. The method of claim 4 wherein said step of placing said pellets into a host material comprises the step of placing said pellets into a host material having a low mass density to enable a lightweight system.

* * * * *